United States Patent [19]

Lloyd

[11] 3,886,371

[45] May 27, 1975

[54] OPTICAL CHARACTER READER SCANNING SUPPORT MECHANISM

[75] Inventor: Lester John Lloyd, Orinda, Calif.

[73] Assignee: Ball Computer Products, Inc., Oakland, Calif.

[22] Filed: Dec. 3, 1973

[21] Appl. No.: 421,396

[52] U.S. Cl. .................................. 250/567; 178/7.6

[51] Int. Cl. .......................................... G01n 21/30

[58] Field of Search .................... 250/566, 567, 571; 178/6.6 P, 7.6, 7.9, 7.91, 11, DIG. 27; 360/101; 346/139 A, 139 D

[56] References Cited

UNITED STATES PATENTS

| | | | |
|---|---|---|---|
| 2,396,705 | 3/1946 | Khalil | 178/11 |
| 3,346,739 | 10/1967 | Jenkner | 250/567 |
| 3,465,145 | 9/1969 | Leiter | 178/7.6 |
| 3,497,610 | 2/1970 | Langberg | 178/7.6 |
| 3,652,793 | 3/1972 | Farr | 346/139 A |
| 3,764,741 | 10/1973 | Long | 346/139 D |

*Primary Examiner*—James W. Lawrence
*Assistant Examiner*—D. C. Nelms
*Attorney, Agent, or Firm*—Limbach, Limbach & Sutton

[57] ABSTRACT

An X–Y scanning mechanism wherein a first carriage is incrementally moved by a motor driven lead screw along a pair of parallel, spaced-apart rods in the Y direction and supports a second carriage which is shuttled back and forth in the X direction on a pair of spaced-apart, parallel second rods by a type of Scotch yoke driven by a constant speed motor through a drive belt, the constant speed motor being mounted on the first carriage.

6 Claims, 5 Drawing Figures

OPTICAL CHARACTER READER SCANNING SUPPORT MECHANISM

BACKGROUND OF THE INVENTION

The invention relates to a scanning mechanism for an optical character reader and more particularly to a mechanism for moving the optical character reading sensor in orthogonally related directions.

In an optical character reading device it is sometimes necessary to have relative motion in orthogonally related directions between the medium on which the characters are imprinted and the optical character reading sensor. Thus, for example, in reading a page of printed material it is necessary that there be relative motion between the optical character reading sensor and the page in a direction both down the page (Y axis) and across the page (X axis) in order for the optical character reading device to interpret all the printed material on the page in line by line fashion.

In many prior art devices this relative motion is obtained by causing the page to move in one direction, such as the Y direction, relative to the optical character reading sensor while the sensor moves in a perpendicular direction, such as the X direction. One reason for this prior art arrangement is that some such devices use a large, powerful and therefore heavy motor to maintain the necessary uniform, linear scan velocity in the X direction during character reading. The large motor is needed because the scanning head starts the X scan from zero velocity and must be quickly brought up to speed before the printed matter is encountered.

To hold the printed medium stationary while moving the scanning mechanism in the X and Y directions requires that the X scanning mechanism be carried by a frame moving in the Y direction, but the large inertial mass of the X scanning mechanism effectively prohibits the necessary incremental, or line by line, motion in the Y direction. It is simply not possible in a practical sense to devise a mechanism which quickly moves such a large inertial mass in incremental steps down the page. Therefore, such prior art devices move the page in the Y direction rather than move the heavy X scanning mechanism.

This arrangement has serious disadvantages. One such disadvantage is that it is more difficult to read printed sheets which are bound together. Another disadvantage is that in moving the document during the reading, the document will be mutilated. Since such devices are commonly used for reading both mail and securities instruments, it can be seen that this danger of mutilation presents serious drawbacks. Still another disadvantage is that the inertia required in the mechanism for moving the document during reading is sufficiently great that the reading speed of the system is seriously hampered.

SUMMARY OF THE INVENTION

The above and other disadvantages are overcome by the present invention of a scanning mechanism for use in a system for reading characters on a stationary medium in orthogonal X and Y directions comprising a first carriage, means for incrementally moving the first carriage in the Y direction, a second carriage movably mounted on the first carriage, constant speed drive means mounted on the first carriage, and reciprocating means powered by the constant speed drive means for shuttling the second carriage in the X direction. In one preferred embodiment, the reciprocating means includes a pair of pulleys mounted on the first carriage so as to rotate in a plane substantially parallel to both the X and Y directions, at least one of the two pulleys being driven by the constant speed driving means, a driving belt connected between the two pulleys, Scotch yoke means mounted on the second carriage, and a pin rigidly mounted at one end in the Scotch yoke means and attached at its other end to the driving belt, whereby the rotation of the belt at a constant speed by the constant speed drive means causes the second carriage to shuttle in the X direction.

The first carriage rides on a pair of spaced-apart, parallel first supports and the second carriage rides on a pair of parallel, spaced-apart second supports mounted on the first carriage and perpendicular to the first supports.

The Scotch yoke means includes a pair of spaced-apart, parallel third supports mounted on the second carriage which extend parallel to the pair of first supports. A third carriage is movably mounted on the third supports and is shuttled back and forth on them by the action of the downwardly extending pin which pivotably mounted in the third carriage and rigidly attached to a driving belt mounted on the pair of pulleys and driven by the constant speed motor. The movement of the belt, and hence the pin, in addition to causing the third carriage to shuttle back and forth in the Y direction simultaneously exerts a force through the third carriage and the third supports on the second carriage to thereby cause it to shuttle back and forth in the X direction.

A motor is used to incrementally turn a lead screw which extends in a direction substantially to the pair of first supports and which is threadably engaged with a mechanism mounted on the first carriage. As the lead screw is incrementally turned in the threaded mechanism mounted on the first carriage, the first carriage is incrementally advanced in line by line fashion in the Y direction along the first supports.

In operation the optical character reading sensor is intended to be mounted on the second carriage and is thereby incrementally moved along with the first carriage in the Y direction and is shuttled along with the second carriage back and forth in the X direction. One advantage of this invention is that it is possible to move the optical character reading device in both the X and Y directions and still have a uniform, linear scanning velocity along the X direction.

This unfirom scanning velocity is possible with the present invention because deceleration of the scanning head only takes place outside of the scanning margin and the inertial shock of stopping the scanning mechanism and changing its direction is taken up by the pulley shaft and the belt rather than by motor. Furthermore, because the belt and motor are continuously moving at a constant and uniform speed there is no problem of accelerating them up to a constant speed during the actual scan. This synchronous speed scanning principle therefore allows the use of a relatively lightweight motor for driving the X scanning mechanism. Since this X scanning motor is mounted on the first carriage, its low inertia makes practical incremental, line-by-line, Y scanning possible.

It is therefore an object of the present invention to provide a scanning mechanism which simultaneously moves in orthogonal directions;

It is another object of the invention to provide a relatively lightweight X–Y scanning mechanism for use in a character reader in which the medium being read is not moved;

It is a still further object of the invention to provide an X–Y scanning mechanism for use in an optical character reading system in which the medium to be read is held stationary and the reading head moving in the X direction across the width of the printed medium is maintained at a substantially uniform and constant linear scanning velocity.

The foregoing and other objectives, features and advantages of the invention will be more readily understood upon consideration of the following detailed description of certain preferred embodiments of the invention, taken in conjunction with the accompanying drawings.

DETAILED DESCRIPTION OF CERTAIN PREFERRED EMBODIMENTS

Figure 1:
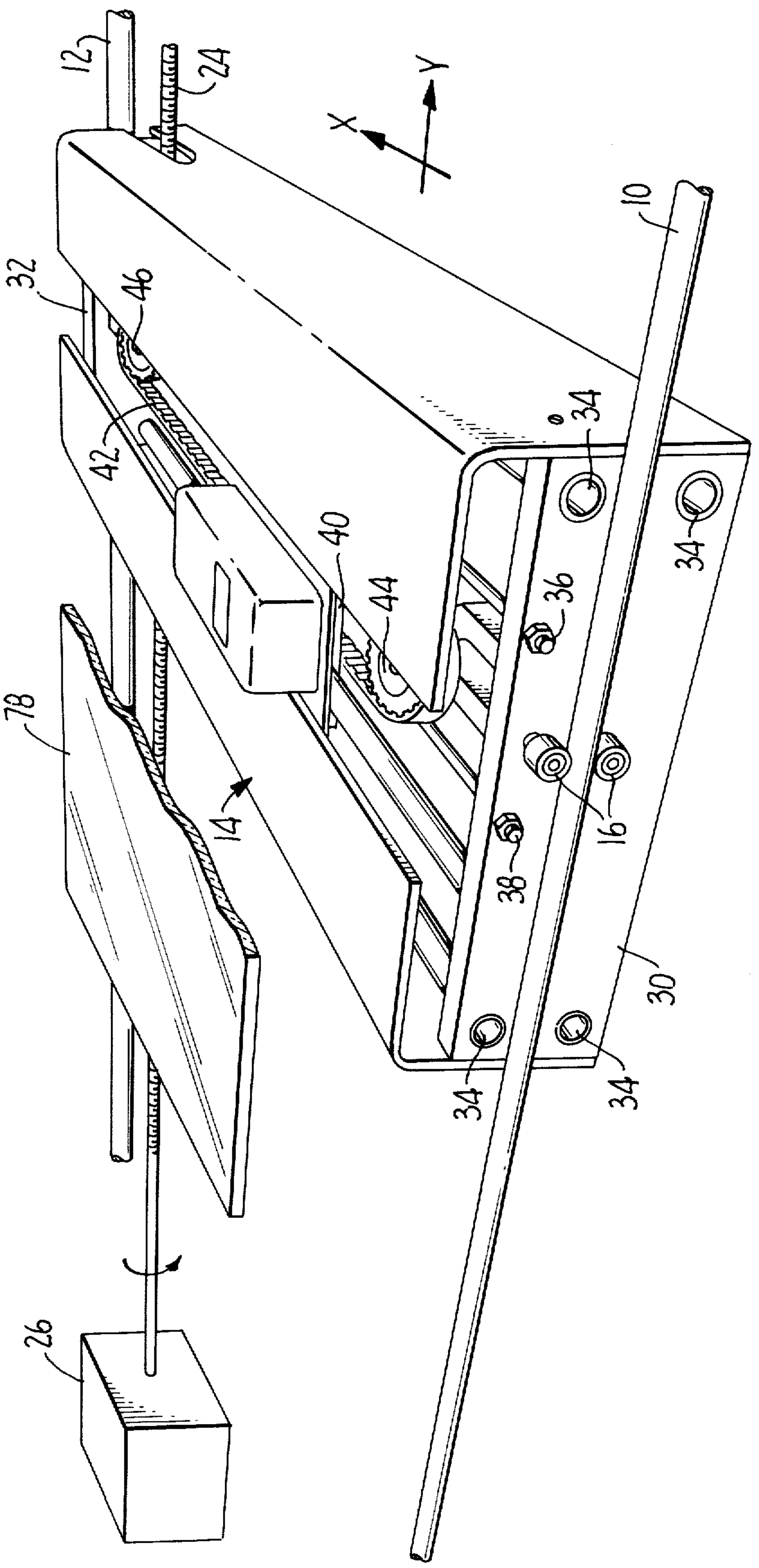
FIG. 1 is a perspective view of the X–Y scanning mechanism of the invention with portions broken away.

Referring now more particularly to FIG. 1, the X–Y scanning mechanism, when removed from its enclosure in the optical character reading system, is illustrated. A pair of substantially parallel first supports 10 and 12 in the form of parallel rods extend in a direction which shall be designated the Y direction. A first carriage 14 is movably mounted on and between the parallel rods 10 and 12. One end of the carriage 14 is supported on the rod 10 by a pair of parallel, vertically aligned, spaced-apart rollers 16. At the opposite end of the carriage, as best viewed in FIG. 2, the carriage 14 is supported on the rod 12 by a C-shaped arrangement of three rollers 18, 20, and 22 radially spaced apart from each other by approximately 120°. At least one of the rollers 18–22 is supported on an eccentrically movable mount, as for example roller 22 which rotates in the horizontal direction on mount 23 so that the arrangement of the rollers can be made to grip the rod 12.

Figure 2:
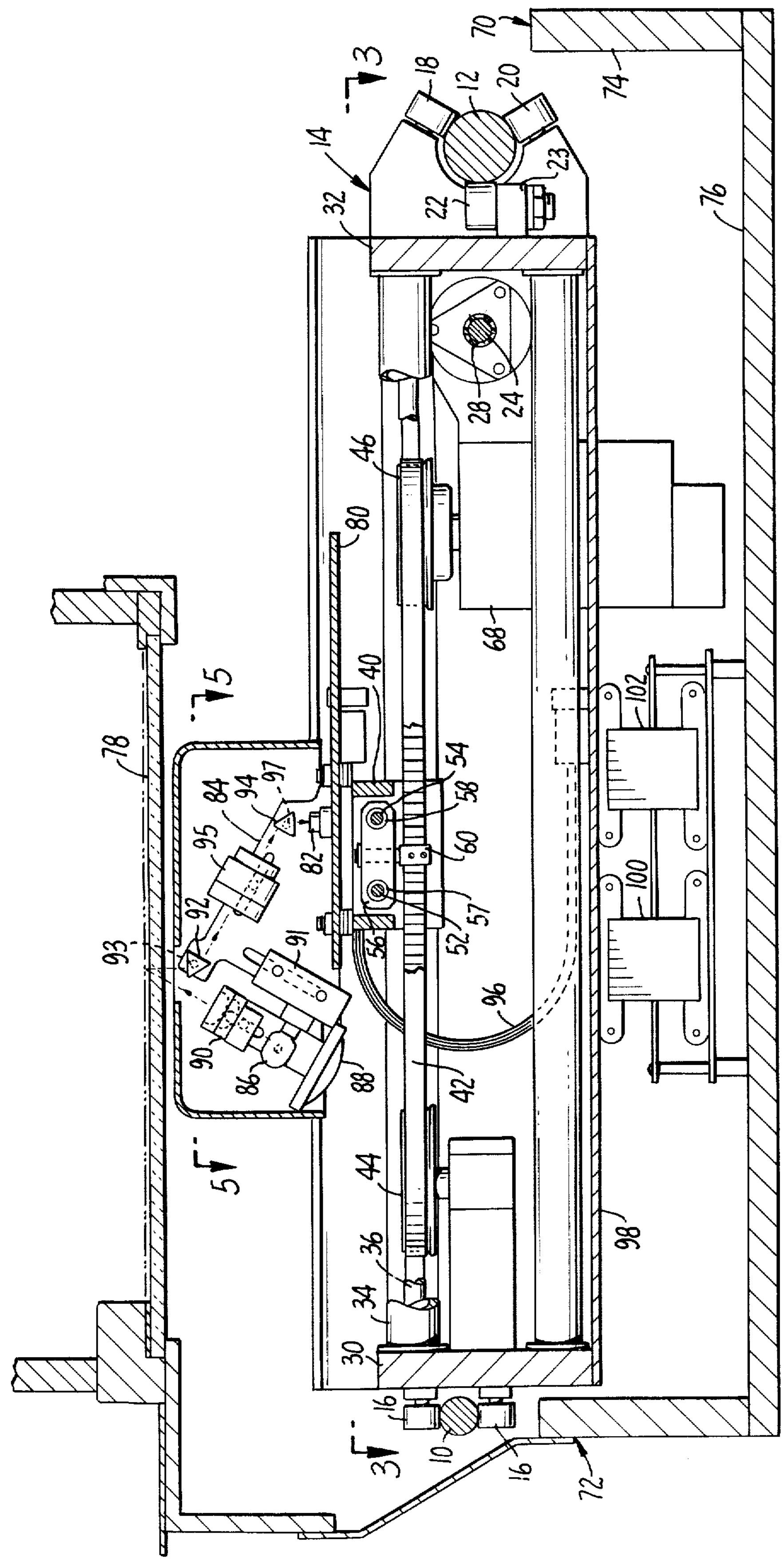
FIG. 2 is an enlarged side view, partly in section and with portions broken away, of the embodiment of FIG. 1.

A lead screw 24 extending substantially parallel to the rod 12 is incrementally rotated by a motor 26. The threads of the lead screw 24, as best shown in FIG. 2, engage the threads of a female fixture 28 rigidly mounted on the carriage 14. As the lead screw 24 is incrementally rotated the carriage 14 is thereby caused to incrementally move in the Y direction a predetermined distance. Although not shown in FIG. 1, it is to be understood that the supports 10 and 12 and the motor 26 are mounted in a surrounding housing 70 (FIG. 2).

A pair of ends plates 30 and 32 adjacent the bars 10 and 12, respectively, are held in a parallel, spaced-apart position by four rods 34 which extend through corresponding corners of the end pieces 30 and 32. Also extending between the end pieces 30 and 32 are a pair of spaced-apart second supporting rods 36 and 38 which are substantially parallel to the rods 34. A second carriage 40 is movably mounted on the second supporting rods 36 and 38 as will be explained in greater detail hereinafter. The second carriage 40 is shuttled back and forth between the end pieces 30 and 32 by a belt 42 which travels around first and second pulleys 44 and 46, respectively, mounted on the first carriage 14 in a manner so as to allow their rotation in a plane parallel to both the X and Y axes.

Figure 3:
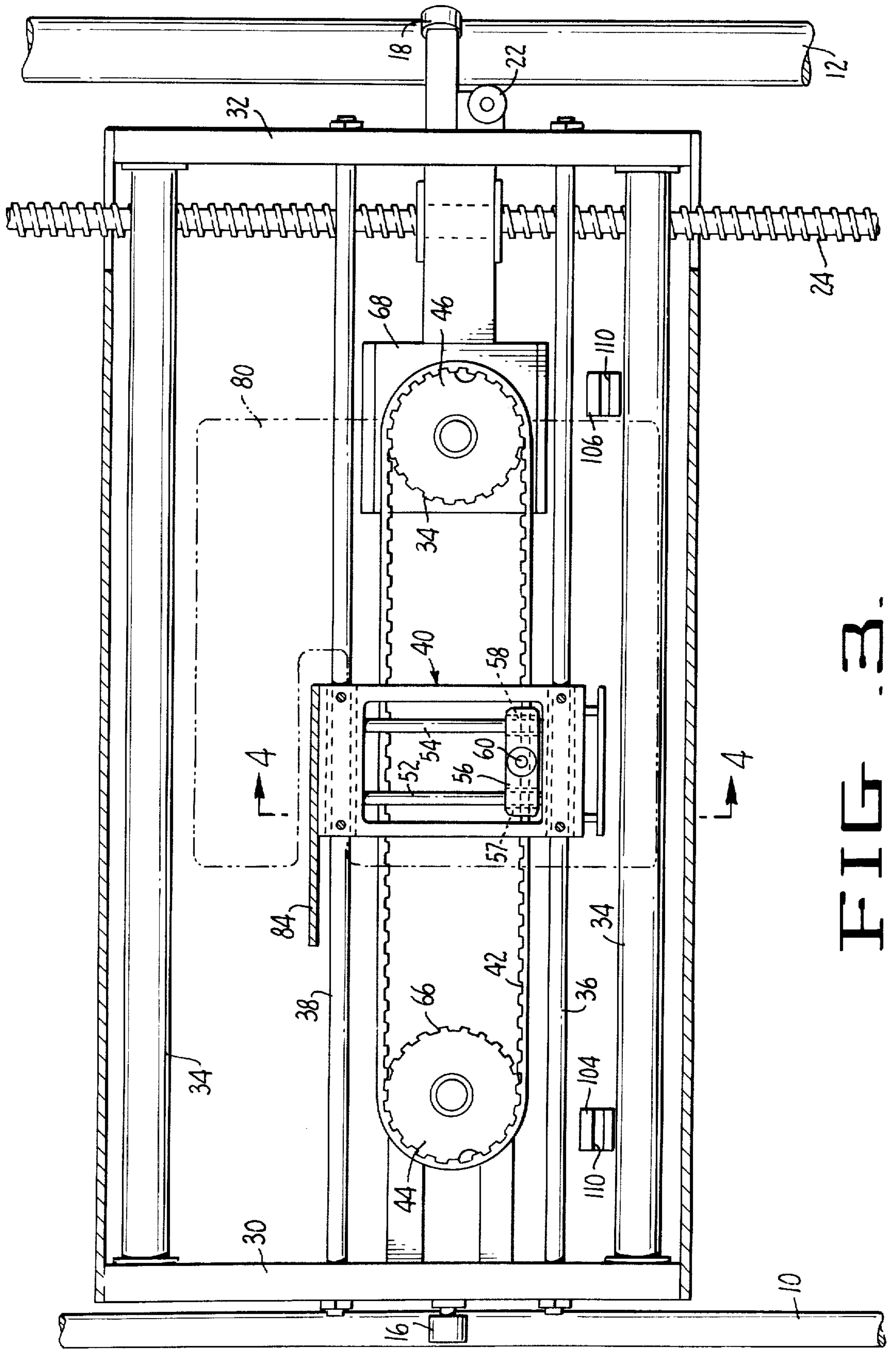
FIG. 3 is an enlarged plan view of the X scanning mechanism with portions removed for clarity of illustration.
Figure 4:
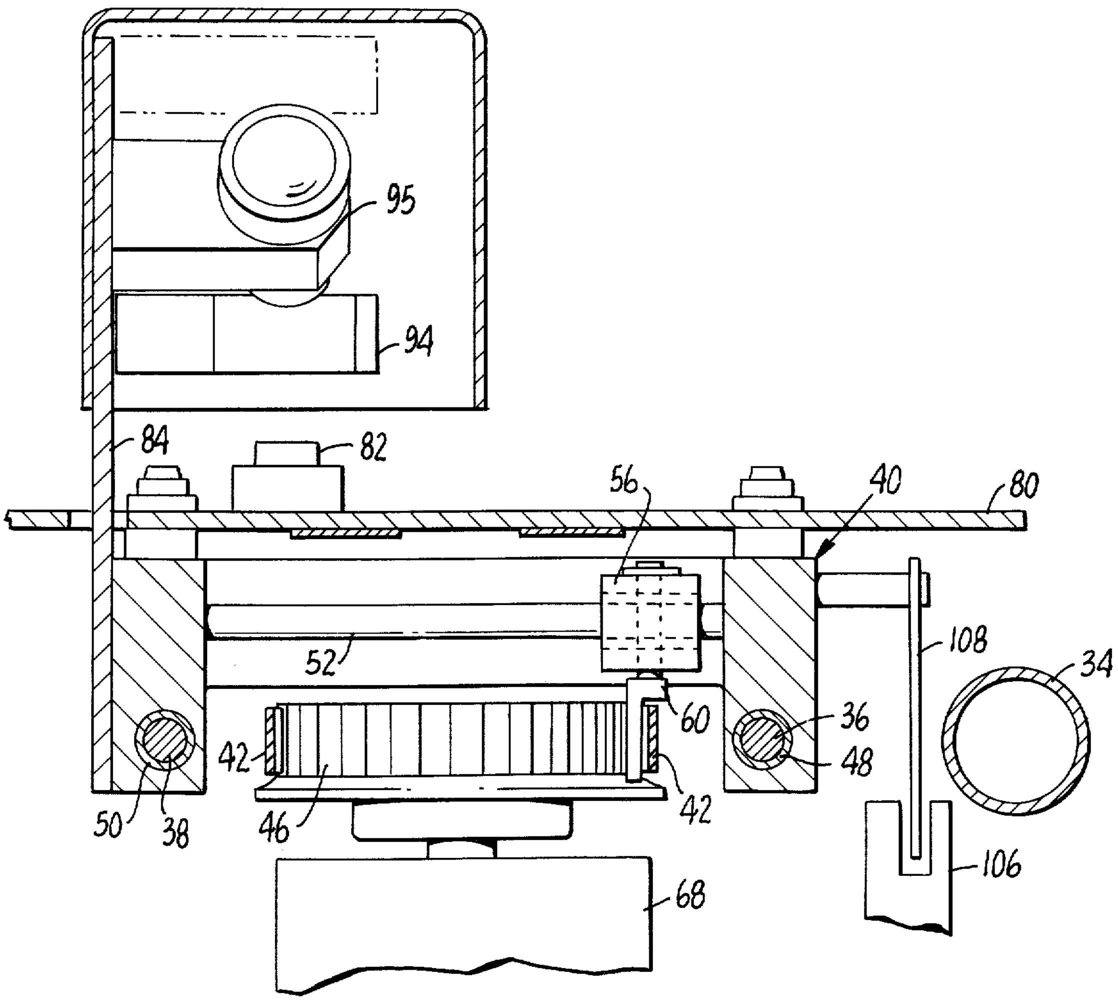
FIG. 4 is an enlarged view partly in section taken generally along the lines 4—4 of FIG. 3.
Figure 5:
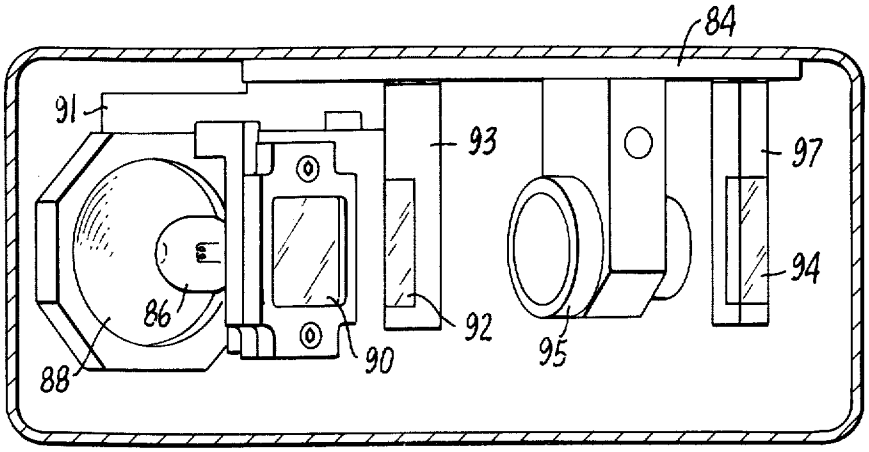
FIG. 5 is an enlarged plan view of the optical sensor support of the embodiment of FIG. 1.

Referring now more particularly to FIGS. 3 and 4, the mechanism by which the second carriage 40 is reciprocated back and forth on the rods 36 and 38 will be described. That carriage 40 is a generally rectangular frame which is hollow at the center. Its ends adjacent the rods 36 and 38 are enlarged and the rods 36 and 38 pass through these end pieces in bores which are lined with bushings 48 and 50, respectively. In this manner, the carriage 40 is slidably mounted on the rods 36 and 38. A pair of spaced-apart, parallel third supporting rods 52 and 54 are carried by the second carriage 40 and extend in the Y direction, substantially parallel to the rods 10 and 12.

A third carriage 56 is movably supported on the rods 52 and 54. The rods 52 and 54 pass through bushings 57 and 58 in bores in the carriage 56. A downwardly extending pin 60 is pivotally mounted in the carriage 56. Together, the arrangement of the carriage 40, the rods 52 and 54, the carriage 56 and the pin 60 constitute a form of Scotch yoke for translating the rotary motion of the belt 42 into a reciprocating motion in the X axis direction. As best shown in FIGS. 2 and 4, the lowermost end of the pin 60 is flattened and is rigidly attached to the belt 42. The belt 42 is provided with driving teeth 62 which mesh with teeth 64 and 66 on the driving pulleys 46 and 44, respectively. The driving pulleys 46 and 44 each have two teeth missing at the spot on their peripheries which coincides with the attachment of the pin 60 to the belt 42.

Referring again to FIG. 2, the driving pulley 46 is rotated by a motor 68 which runs at a substantially constant speed and which is mounted on the carriage 14. In operation, assuming for the sake of the example that the pulleys 46 and 44 rotate in a counterclockwise direction as viewed in FIG. 2, the motion of the portion of the belt 42 attached to the pin 60 towards the pulley 46 causes the carriage 56 to move in the X direction and thereby exert a force on the carriage 40 through the support bars 52 and 54 so as to move the carriage 40 from left to right as viewed in FIG. 2. When the portion of the belt 42 together with the pin 60 pass around the periphery of the pulley 46 during its rotation the carriage 56 travels in the Y direction a distance equivalent to the diameter of the pulley 46 and the carriage 56 is moved from one end of the carriage 40 to the opposite end along the bars 52 and 54. Since the pin 60 is pivotally mounted in the carriage 56 there is no torque exerted on the carriage 56 or on the carriage 40.

As the portion of the belt 42 together with the attached pin 60 travels from the pulley 46 to the pulley 66, at a substantially linear scanning velocity, the belt exerts a force on the carriage 40 through the pin 60, the carriage 56 and the support bars 52 and 54 so as to move the carriage 40 from right to left as viewed in FIG. 2 at a linear scanning velocity. When the pin 60 and the portion of the belt 42 to which it is attached reach the pulley 44 the process is repeated and the carriage 56 is moved back again to its original position on the carriage 40. In this way the carriage 56 is simultaneously shuttled in the Y direction and the carriage 40 is shuttled in the X direction.

Because the pin 60 is rigidly and pivotally mounted in the carriage 56, it is not necessary that the belt 42 also be stiff since it does not have to add support to the pin 60 against wobbling. The use of such a lightweight belt cuts down on inertia and adds to the low mass design which helps make the Y scanning mechanism practical.

Referring now more particularly to FIG. 2, the X–Y scanning mechanism of the invention is housed in a casing 70 having left and right sidewalls 72 and 74, respectively, and a bottom 76. It will be understood that the casing also has endwalls, not shown. The sidewalls 72 and 74 support a glass viewing plate 78 above the carriages 14 and 40. The carriage 40 has a printed circuit board 80 mounted on its upper surface which carries the optical components and some of the electronic components of the system. The printed circuit board 80 is mounted horizontally and has a photo-electric detector 82 in the form of a reticon cell mounted on its top surface so as to point upwardly. At the end of the carriage 40 which is adjacent to the supporting bar 38 a triangularly shaped support 84 extends vertically upwardly.

The support 84 is generally in the shape of a right triangle with the edge which corresponds to its hypotenuse being adjustably affixed to the carriage 40 by a pair of screws (not shown). Along the shorter of the two legs of the triangle, a light beam projecting assembly is mounted which includes a light bulb 86 backed by a parabolic reflector 88 which reflects beams of light through a collimating lens 80 to impinge upon the printed medium placed on top of the glass 78. The light 86, the reflector 88 and the lens 90 are all mounted on a bracket 91 which is adjustably mounted on the support 84.

The light beam reflected from the medium back through the glass 78 is refracted by a prism 92 held in a frame 93 which is rotatably mounted on the support 84. The prism 92 causes this refracted light beam to travel along a line generally parallel to the longer leg of the edge of the triangular support 84 and through a focusing lens assembly 95 which is slidably mounted on the support 84. The returning light beam is again refracted vertically downwardly by a second prism 94 to impinge upon the photo cell 82. The prism 94 is held in a frame 97 which is rotatably mounted on the support 84. The adjustable supports 91, 93, 95 and 97 allow the optical components to be easily aligned. Thus, as the carriage 40 scans in the X direction, the light beam makes a point by point search across the face of the printed medium laying on the glass plate 78 and variations in the intensity of the reflected light beam are converted into electronic impulses by the photo cell 82.

Since the signals from the photo cell 82 are at a relatively low voltage level, they are processed by an immediately adjacent printed circuit on the board 80 and the output from the printed circuit on the board 80 is fed by means of a printed circuit cable rollout 96 to still another printed circuit board 98 fastened between the bottom edges of the end pieces 30 and 32.

The printed circuit board 98 adds a lightweight rigidity to the construction of the carriage 14. It aids in preventing any wobble between the two ends 30 and 32. A pair of printed circuit cable rollouts 100 and 102 connect the printed circuit board 98 with the remaining electronic circuitry of the optical character reader (not shown). The purpose of the rollouts 96, 100 and 102 is to allow the respective X and Y carriages 40 and 14 to have complete freedom of movement.

In order for the optical character reading device to determine the margins of the scan, a pair of left and right margin, photo-electric sensors 104 and 106, respectively, are spaced-apart and mounted on the upper surface of the board 98 at a predetermined distance corresponding to the expected width of the medium being read by the optical character reading system. The devices 104 and 106 have vertical slots 110 which extend upwardly and generally parallel to the supporting bar 36. A downwardly extending plate 108 is affixed to the end of the carriage 40 which is nearest to the sliding support bar 36. The length of the plate 108 and its position on the carriage 40 are such that its bottom edge intersects the slot 110 of the margin detectors 104 and 106 when the carriage is moved to the extreme positions of its scanning cycle. When the bottom edge of the plate 108 intersects the slots 110 signals are generated in the corresponding margin detectors 104 or 106 which cause the electronic circuitry of this system (not shown) to determine that the end of the scan line has been reached and that it is time to incrementally advance the carriage 14 in the Y direction and to program the electronic circuits to receive the signal from a new X scanning line. It should be noted that the electronic circuitry designed to utilize the embodiment of this invention scans first one line in the conventional forward direction and the next line in the reverse direction along the X scanning axis. The electronic circuitry is designed to compensate for the reverse reading of the information on alternate lines.

While the X–Y scanning mechanism of the mechanism has been described above in reference to an optical character reading system, it should be apparent that the mechanism to the invention has applications in other areas where an X–Y scanning mechanism is necessary. For example, in other embodiments the optical recognizing mechanism might be replaced by a magnetic head while in still other embodiments the X–Y scanning mechanism might be used in a facsimile reproducing system.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. A scanning support mechanism movable in orthogonal X and Y directions comprising a first carriage, means for incrementally moving the first carriage in the Y direction, a second carriage movably mounted on the first carriage, constant speed drive means mounted on the first carriage, and reciprocating means powered by the constant speed drive means for shuttling the second carriage in the X direction, the reciprocating means including a pair of pulleys mounted on the first carriage so as to rotate in a plane substantially parallel to both the X and Y directions, at least one of the two pulleys being driven by the constant speed driving means, a driving belt connected between the two pulleys, Scotch yoke means mounted on the second carriage, and a pin rigidly mounted at one end in the Scotch yoke means and attached at its other end to the driving belt, whereby the rotation of the belt at a constant speed by the constant speed drive means exerts a force on the second carriage through the Scotch yoke means so as to cause the second carriage to shuttle in the X direction.

2. In a system for reading characters on a medium in orthogonal X and Y directions, an X–Y scanning support mechanism comprising a pair of spaced-apart, parallel first supports, a first carriage movably mounted on the first supports, means for incrementally moving the first carriage along the first supports in a predetermined first direction, a pair of parallel, spaced-apart second supports mounted on the first carriage and perpendicular to the first supports, a second carriage movably mounted on the second supports, a constant speed motor mounted on the first carriage, a pair of spaced-apart, parallel third supports mounted on the second carriage parallel to the first supports, a third carriage movably mounted on the third supports, and reciprocating means driven by the constant speed motor for shuttling the second carriage on the second supports over a predetermined distance in directions perpendicular to the first direction and including means for shuttling the third carriage on the third supports in directions parallel to the first direction, whereby the second carriage is caused to move in two orthogonal directions.

3. An X–Y scanning support mechanism as recited in claim 2 wherein the reciprocating means comprises a first pulley, a second pulley driven by the constant speed motor, the first and second pulleys being rotatably mounted on the first carriage and spaced apart in a direction substantially parallel to the second supports, and means for attaching the third carriage to the belt whereby the rotation of the belt around the first and second pulleys by the constant speed motor drags the third carriage back and forth on the third supports in directions parallel to the first direction and drags the second carriage back and forth in directions perpendicular to the first direction by forces exerted through the third carriage and the third supports.

4. An X–Y scanning support mechanism as recited in claim 2 wherein the means for incrementally moving the first carriage comprises a threaded lead screw, means for incrementally rotating the lead screw, and means rigidly mounted on the first carriage for threadably engaging the lead screw, whereby as the lead screw is incrementally rotated the first carriage is incrementally advanced in line by line fashion.

5. An X–Y scanning support mechanism as recited in claim 2, wherein the second carriage comprises a pair of spaced-apart, parallel endwalls, a plurality of rods interconnecting the endwalls, and a printed circuit board mounted between the endwalls.

6. An X–Y scanning support mechanism as recited in claim 2 further comprising a projecting member attached to the second carriage, and a plurality of spaced-apart margin sensors mounted on the first carriage for producing separate electrical signals whenever the projecting member passes immediately adjacent to each of them.

* * * * *